(12) United States Patent
Eckert et al.

(10) Patent No.: US 9,660,392 B2
(45) Date of Patent: May 23, 2017

(54) ELECTRICAL PLUG AND ENERGY TRANSMISSION ARRANGEMENT

(71) Applicant: Robert Bosch GmbH, Stuttgart (DE)

(72) Inventors: Bernd Eckert, Vaihingen an der Enz (DE); Andreas Mittag, Markgroeningen (DE); Ian Faye, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 161 days.

(21) Appl. No.: 14/440,425

(22) PCT Filed: Sep. 13, 2013

(86) PCT No.: PCT/EP2013/068987
§ 371 (c)(1),
(2) Date: May 4, 2015

(87) PCT Pub. No.: WO2014/067701
PCT Pub. Date: May 8, 2014

(65) Prior Publication Data
US 2015/0303625 A1 Oct. 22, 2015

(30) Foreign Application Priority Data

Nov. 5, 2012 (DE) ........................ 10 2012 220 102

(51) Int. Cl.
*H01R 13/66* (2006.01)
*B60L 11/18* (2006.01)
*H01R 13/703* (2006.01)

(52) U.S. Cl.
CPC ...... *H01R 13/6683* (2013.01); *B60L 11/1816* (2013.01); *B60L 11/1818* (2013.01);
(Continued)

(58) Field of Classification Search
CPC ........................ H01R 13/6683; B60L 11/1816
(Continued)

(56) References Cited

U.S. PATENT DOCUMENTS 5,681,187 A 10/1997 Fukushima et al.
5,751,135 A 5/1998 Fukushima et al.
(Continued)

FOREIGN PATENT DOCUMENTS

CN 101997243 3/2011
CN 102185363 9/2011
(Continued)

OTHER PUBLICATIONS

International Search Report for Application No. PCT/EP2013/068987 dated Oct. 14, 2013 (English Translation, 2 pages).

*Primary Examiner* — Sun Lin
(74) *Attorney, Agent, or Firm* — Michael Best & Friedrich LLP

(57) ABSTRACT

The invention relates to an electrical plug (24) having a connection unit (36) which can be coupled to an electrical line (26) in order to transmit electrical energy, having at least one electrical contact pin (30) which has a plug section (32) and a coupling section (34), wherein the coupling section (34) is electrically coupled to the connection unit (36), and wherein the plug section (32) is designed to provide a releasable plug connection to an associated contact socket (18) in order to electrically couple the contact pin (30) to the contact socket (18), and having a detection unit (38) which is designed to) detect a tensile force which is exerted on the contact pin (30) and/or a movement of the contact pin (30) relative to the contact socket (18), and to provide a disconnection signal for interrupting the energy transmission process.

14 Claims, 3 Drawing Sheets

(52) U.S. Cl.
 CPC ...... *H01R 13/7038* (2013.01); *Y02T 10/7005* (2013.01); *Y02T 10/7072* (2013.01); *Y02T 90/14* (2013.01)

(58) Field of Classification Search
 USPC .......................................................... 320/165
 See application file for complete search history.

(56) References Cited

U.S. PATENT DOCUMENTS

| | | |
|---|---|---|
| 2003/0162448 A1 | 8/2003 | Routtenberg et al. |
| 2005/0048848 A1 | 3/2005 | Axenbock et al. |

FOREIGN PATENT DOCUMENTS

| | | |
|---|---|---|
| DE | 3212983 | 11/1982 |
| DE | 4212207 | 10/1993 |
| DE | 102006047039 | 11/2007 |
| JP | 57126081 | 8/1982 |
| JP | S57126081 | 8/1982 |
| JP | 2008305684 | 12/2008 |
| WO | 2008125813 | 10/2008 |

ELECTRICAL PLUG AND ENERGY TRANSMISSION ARRANGEMENT

BACKGROUND OF THE INVENTION

The present invention relates to an electrical plug having a connection unit which can be coupled to an electrical line in order to transmit electrical energy, and having at least one electrical contact pin which has a plug section and a coupling section, wherein the coupling section is electrically coupled to the connection unit and wherein the plug section is designed to provide a releasable plug connection to an associated contact socket.

The present invention further relates to an energy transmission arrangement having an electrical plug of the type mentioned above and an electrical line which is electrically coupled to the connection unit of the electrical plug.

It is universally known in the field of automotive drive technology to use an electric machine as the sole drive or jointly with a drive motor of another type (hybrid drive). In such electric or hybrid vehicles, electric machines are typically used as the drive motor, said electric machines being supplied with electrical energy by an electrical energy storage, such as, e.g., an accumulator. Depending on the charging state, the electrical energy storages of electric vehicles or plug-in hybrid vehicles have to be regularly connected to an electrical energy supply network in order charge the energy storage with electrical energy.

In order to transmit the electrical energy from a charging station to the vehicle, an inductively coupled, wireless energy transmission system or a cable can, e.g., be used. When using a cable, it is particularly user friendly if the electric vehicle or the hybrid vehicle can be connected to any arbitrary standard electrical outlet in order to charge the fraction battery. In the case of such standard electrical outlets, no special blocking device is, however, present which prevents a simple release of the charging cable. The charging cable can thus be disconnected under a full load of the charging process (approximately 3.6 kW). This can in fact lead to arcing between the plug of the charging cable and the electrical outlet. As a result, the plug and the electrical outlet can be damaged. In addition, there is a risk of burns to the user.

When using the standardized EVSE (electric vehicle supply equipment) with corresponding plug connectors, the disconnection of the charging cable under load is prevented by mechanical buttons or electromagnetic locking mechanisms. A switch, which interrupts the energy transmission before the charging cable is disconnected, is, for example, simultaneously actuated when actuating a corresponding mechanical button. When using an electromechanical locking mechanism, said mechanism first releases the plug if the charging process has been properly completed or has been interrupted by user intervention (e.g. by actuating a switch).

The electric vehicle or hybrid vehicle can however only be charged at special EVSE charging stations and not at any arbitrary standard electrical outlet. The user-friendliness of such vehicles is therefore greatly reduced.

SUMMARY OF THE INVENTION

The present invention therefore provides an electrical plug having a connection unit which can be coupled to an electrical line in order to transmit electrical energy, having at least one electrical contact pin which has a plug section and a coupling section, wherein the coupling section is electrically coupled to the connection unit, and wherein the plug section is designed to provide a releasable plug connection to an associated contact socket in order to electrically couple the contact pin to the contact socket, and having a detection unit which is designed to detect a tensile force which is exerted on the contact pin and/or a movement of the contact pin relative to the contact socket, and to provide a disconnection signal for interrupting the energy transmission process.

The present invention further provides an energy transmission arrangement comprising an electrical plug according to the invention, an electrical line which is electrically coupled to the connection unit of the electrical plug and a control unit which is electrically coupled to the detection unit of the electrical plug and is designed to control the transmission of electrical energy across the electrical line on the basis of the disconnection signal and/or the switch-on signal of the detection unit.

A releasing of the plug connection can be detected in a timely fashion by the detection unit; and, as a result, a disconnection signal for interrupting the energy transmission process can be provided. In so doing, an electric arc is prevented from forming. There is furthermore no risk of burns to the user. In addition, damage to the electrical plug and the associated contact socket is prevented.

The handling of the electrical plug is very simple because no special mechanical buttons have to be operated in order to release the plug connection. Furthermore, the plug can be separated from the contact socket at any time. It is, for example, not necessary to wait until a charging process has been properly completed before removing the plug from the contact socket.

In addition, the electrical plug according to the invention provides the option of using standard electrical outlets as contact sockets. This enables every standard electrical outlet to be used, e.g., to charge an electric vehicle. The user-friendliness of the electric vehicle/hybrid vehicle is thus significantly increased.

It is particularly preferred if the detection unit is designed to provide the disconnection signal if the tensile force exerted on the contact pin exceeds a force threshold value and/or the movement of said contact pin exceeds a movement threshold value.

As a result of this measure, a releasing of the plug connection is reliably detected. Low tensile forces at the plug or small movements/vibrations of the plug do not lead to a shutdown of the energy transmission process. In so doing, the stability of said energy transmission process can be increased.

In a further embodiment, the threshold values are determined in such a way that plug connection to the associated contact socket exists at least until reaching the threshold values.

This ensures that the electrical contact between the plug and the contact socket is only then separated if the energy transmission has already been interrupted. By means of this measure, electric arcs can no longer develop. As a result, there is no risk of burns to the user or of undesired ignitions of combustible materials. Damage to the electrical plug and the associated contact socket is prevented when disconnecting the electrical plug.

According to a further embodiment, the detection unit has a force measuring device which is mechanically coupled to the contact pin and is designed to detect the tensile force on the basis of a force between the contact pin and the contact socket when releasing the plug connection.

In this embodiment, the tensile force is ascertained directly at the contact pin. If the tensile force exceeds the force threshold value, a releasing of the plug connection is then detected and a disconnection signal for disconnecting the energy transmission process is generated.

In a further embodiment, the force measuring device is designed to detect a compression force between the contact pin and the contact socket when the plug connection is being provided, wherein the force threshold value is a detected value of the compression force when providing the plug connection.

By means of this measure, the force threshold value can be very easily determined by the compression force being measured which is necessary for providing the plug connection. If the tensile force exceeds the force threshold value ascertained in this manner, a releasing of the plug connection can thus be reliably inferred.

According to a further embodiment, the detection unit has a displaceable element which is held in an initial position by a preload force and which can be moved out of the initial position if the tensile force exceeds the preload force, the preload force being the force threshold value.

In this embodiment, the displaceable element is held in the initial position until the tensile force exceeds the force threshold value. When the force threshold value is exceeded, the displaceable element is moved out of the initial position and the release of the plug connection is detected. The energy transmission can thus be interrupted by means of the disconnection signal in a timely fashion prior to the disconnection of the electrical contact between the plug and the contact socket.

According to a further embodiment, the detection unit has a spring element for providing the preload force.

The preload force can be very easily and cost effectively provided by means of the spring element.

In a further embodiment, the detection unit has a pushing device which can be displaced on the basis of the movement of the contact pin, wherein the detection unit is designed to provide the disconnection signal if the pushing device is displaced by the movement threshold value in relation to an initial position.

In this embodiment, a releasing of the plug connection is detected as soon as the pushing device is displaced by the movement threshold value, i.e. by a predefined distance of travel in relation to the initial position. The movement threshold value is advantageously selected in such a way that the plug is still electrically connected to the contact socket in this position. As a result, damage to the plug or the contact socket by a possible formation of an electric arc is prevented.

According to a further embodiment, the detection unit is designed to provide a switch-on signal for starting the energy transmission process if the initial position of the pushing device is set.

By means of the pushing device, it can be very easily detected whether the plug is completely accommodated in the contact socket. If the pushing device is situated in the initial position, the establishment of the plug connection is detected and the switch-on signal is generated in order to start the energy transmission process.

According to a further embodiment, the detection unit has an additional spring element which is designed to exert a force on the pushing device in order to displace said pushing device in accordance with the movement of the contact pin.

By means of this measure, the pushing device is displaced at least across a predefined region synchronously to the movement of the contact pin (relative to the contact socket). Hence, the releasing/providing of the plug connection can be reliably detected.

In a further embodiment, the pushing device has a sleeve which is disposed concentrically with respect to the contact pin.

This constitutes a simple and cost-effective implementation of the pushing device.

In a further embodiment, the detection unit is designed to provide the disconnection signal and/or the switch-on signal of a control unit for controlling the energy transmission process.

A control unit coupled to the detection unit can disconnect or, respectively, start the energy transmission by means of the provided disconnection signal/switch-on signal. An already available charging control unit of an electric vehicle can, e.g., be used as the control unit. Provision can also alternatively be made for a separate control unit, which is designed as part of an energy transmission arrangement (e.g. as part of a charging cable).

In one embodiment of the energy transmission arrangement, the electrical line is furthermore coupled to a traction battery of an electrically driven vehicle, wherein the control unit is designed to interrupt a charging process of the traction battery on the basis of the disconnection signal.

This constitutes a preferred embodiment of the energy transmission arrangement according to the invention. The electrical line is thereby preferably coupled to the traction battery by means of a suitable charging device. As a result, an electrically driven vehicle can be charged at any arbitrary standard electrical outlet. Special unlocking/locking mechanisms are not required. The electrical plug can be disconnected from the associated contact socket at any time without the risk of an electric arc forming.

It goes without saying that the features, properties and advantages of the electrical plug according to the invention also apply to or can be accordingly applied to the energy transmission arrangement.

DETAILED DESCRIPTION

Figure 1:
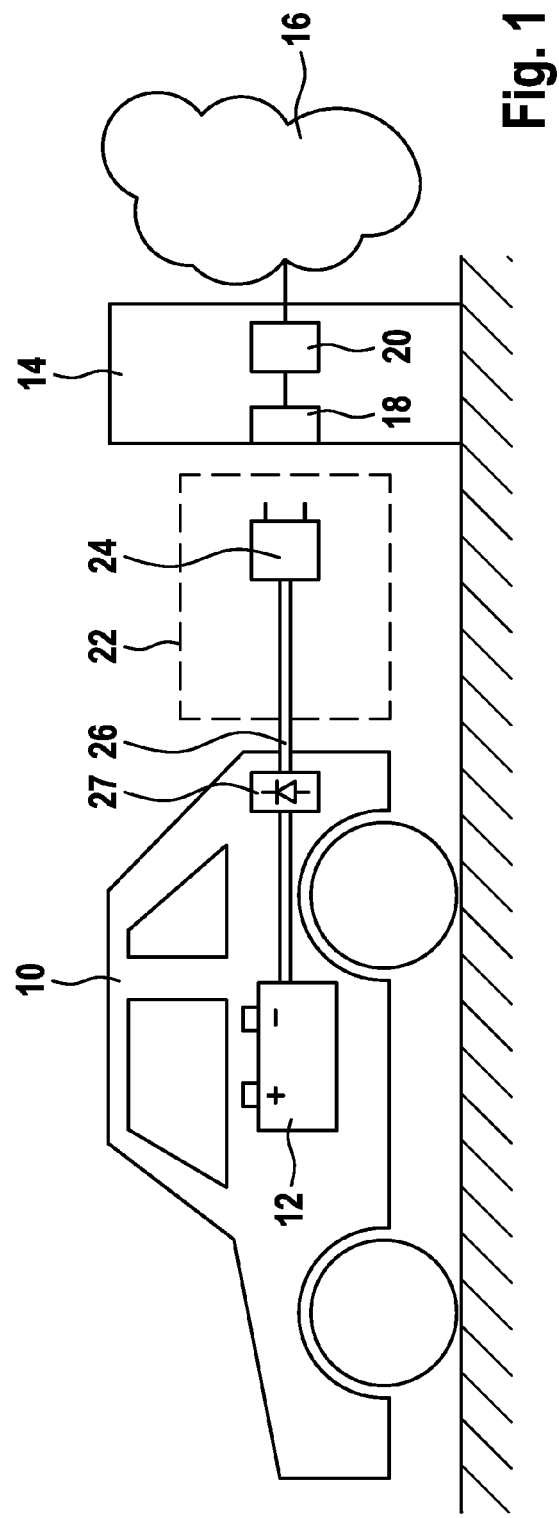
FIG. 1 shows in schematic form an electrically driven vehicle which can be coupled to a charging station by means of the energy transmission arrangement.

An electric vehicle is schematically depicted in FIG. 1 and generally denoted with the reference numeral 10. In an alternative exemplary embodiment, the vehicle 10 can also be a plug-in hybrid vehicle. The electric vehicle 10 typically has an induction machine which is not depicted in detail in FIG. 1 and is used as a drive motor. In addition, the electric vehicle 10 has a traction battery 12 which provides electrical energy for operating the induction machine. After a certain operating time of the electric vehicle 10, the traction battery 12 has to be recharged. For this purpose, the electric vehicle 10 is connected to a charging station 14 which in turn is coupled to an energy supply network 16. The charging station has a contact socket 18, which corresponds to a standard electrical outlet in the present example and is used to connect the electric vehicle 10 to the charging station 14. In addition, the charging station 14 comprises an energy transmission unit 20, by means of which the contact socket 18 is coupled to the energy supply network 16.

In order to charge the electric vehicle 10, the traction battery 12 is electrically connected to the charging station 14 with the aid of an energy transmission arrangement 22, in the present case with the aid of a charging cable 22. The charging cable 22 has an electrical plug 24 and an electrical line 26 which is coupled at one end to the plug 24. The other end of the electrical line 26 is electrically connected to the traction battery 12 of the electric vehicle 10 by means of a charging device 27. The plug 24 is inserted into the contact socket 18 in order to establish an electrical contact between the electric vehicle 10 and the energy supply network 16.

The plug 24 must be released from the contact socket 18 in order to end the charging process of the fraction battery 12 (e.g. because the electric vehicle 10 is needed for use). According to the invention, the plug 24 is designed to detect early a releasing of the plug connection between the electrical plug 24 and the contact socket 18 and to provide a disconnection signal as a result of said early detection in order to interrupt the energy transmission between the traction battery 12 and the energy supply network 16 before the electrical connection between the plug 24 and the contact socket 18 is disconnected. In this way, an electric arc can be prevented from forming between the plug 24 and the contact socket 18. There is consequently no risk of burns for the user of the charging cable 22. Furthermore, the plug 24 and the contact socket 18 are protected from being damaged.

Figure 2:
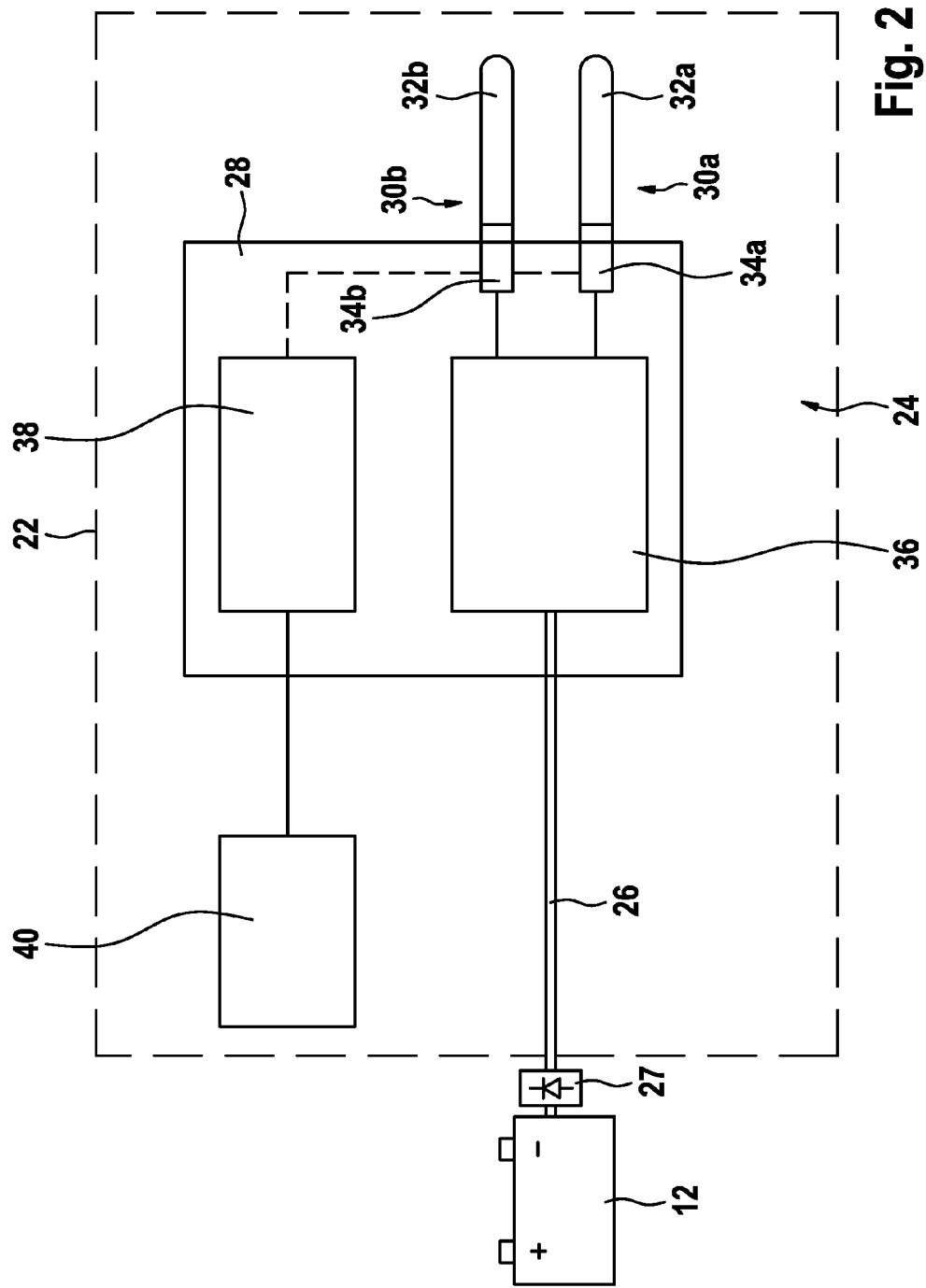
FIG. 2 shows in schematic form a detailed view of the energy transmission arrangement comprising an electrical plug.

To illustrate this point, a detailed view of the energy transmission arrangement 22 or, respectively, the charging cable 22 is shown in FIG. 2.

The plug 24 has a plug housing 28 in which two contact pins 30a, 30b are partially accommodated. The contact pins 30a, 30b each have a plug section 32a, 32b and a coupling section 34a, 34b. The plug sections 32a, 32b are designed to provide a releasable plug connection to the contact socket 18 in order to electrically couple the contact pins 30a, 30b to the contact socket 18. The coupling sections 34a, 34b are coupled to a connection unit 36 which electrically couples the contact pins 30a, 30b to the electrical line for the purpose of transmitting electrical energy.

According to the invention, the electrical plug 24 furthermore comprises a detection unit 38 which is designed to detect a tensile force which is exerted on the contact pins 30. The detection unit 38 can additionally or alternatively be designed to detect a movement of the contact pins 30 relative to the contact socket 18.

If the plug 24 is pulled out of the contact socket 18, a certain tensile force must then be exerted on the plug 24. The detection unit 38 measures, e.g., the force acting on the contact pins 30 and compares the same to a force threshold value. If the measured tensile force exceeds the force threshold value, a release of the plug connection between the plug 24 and the contact socket 18 is then detected. As a result, the detection unit 38 generates a disconnection signal and transmits the same to a control unit 40. On the basis of the disconnection signal, the control unit 40 interrupts the energy transmission process between the energy supply network 16 and the traction battery 12 before the electrical connection between the contact pins 30 and the contact socket 18 is broken. An electric arc is thus prevented from forming. The control unit 40 is provided as a separate unit in this exemplary embodiment, which together with the plug 24 forms a part of the charging cable 22. In an alternative embodiment, a charging control device which is already present in the electric vehicle 10 can also be used for controlling the energy transmission process as a function of the disconnection signal.

In addition, there is the option of detecting the movement of the contact pins 30 relative to the contact socket 18 by means of the detection unit 38. If the plug connection between the electrical plug and the contact socket 18 is released, the contact pins 30 have to be pulled out of the contact socket 18. If the detected movement of the contact pins 30 exceeds a predefined movement threshold value (i.e. a predefined maximum distance of travel), the release of the plug connection is detected and the disconnection signal is generated and transmitted on to the control unit 40.

The force threshold value and the movement threshold value are thereby preferably dimensioned in such a way that a releasing of the plug connection is detected and thus a disconnection of the energy transmission between the traction battery 12 and the energy supply network 16 can take place prior to the electrical contact between the contact pins 30 and the contact socket 18 being broken. The threshold values for stabilizing the energy transmission do, however, have to be so largely selected that the charging process of the traction battery 12 is not interrupted when small vibrations occur at the plug 24.

With the aid of the detection unit 38, it can further be determined whether the plug 24 is inserted into the contact socket 18 and is thereby completely accommodated in the contact socket 18 at the end of the insertion process. In addition, the detection unit 38 in turn detects the movement of the contact pins 30 relative to the contact socket 18. When a certain position of the contact pins 30 relative to the contact socket 18 has been achieved, the insertion of the plug 24 into the contact socket 18 is detected and a switch-on signal is generated which is transmitted to the control unit 40 for starting the charging process of the traction battery 12.

By switching on or, respectively, switching off the energy transmission process in a controlled manner, the greatest possible operational safety of the charging cable 22 is ensured.

In the following FIGS. 3 to 5, different embodiments of the electrical plug 24 and in particular of the detection unit 38 according to the invention are shown in a schematic view. Because the focus of the following figures is on the different implementation forms of the detection unit 38, the other elements of the plug 24 are not depicted in said figures for the sake of clarity.

Figure 3:
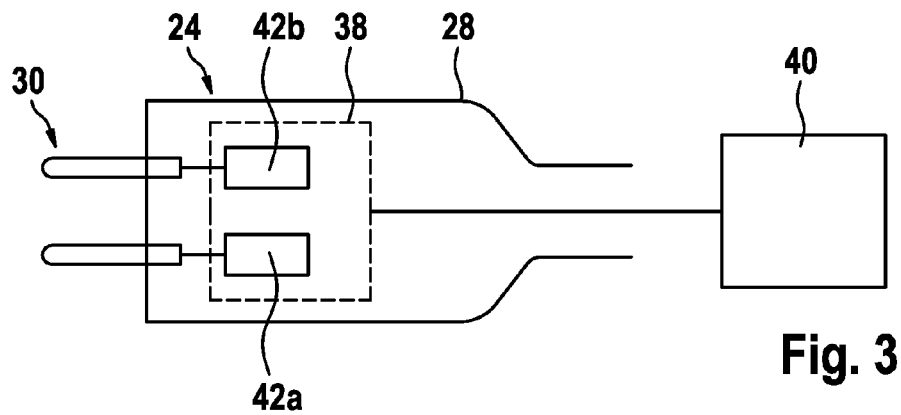
FIGS. 3 to 5 show in schematic view different embodiments of the electrical plug.

FIG. 3 shows the plug 24 comprising the plug housing 28 and the contact pins 30. In this exemplary embodiment, the detection unit 38 has force measuring devices 42a, 42b which each are mechanically coupled to one of the contact pins 30a, 30b. With the aid of the force measuring devices 42, the force exerted on the contact pins 30 when releasing/providing the plug connection can be measured. If the plug 24 is, e.g., pulled out of the contact socket 18, the force measuring devices 42 then detect the tensile forces exerted on the contact pins 30. If the measured tensile forces exceed the predefined force threshold value, the releasing of the plug connection is detected and the disconnection signal is transmitted to the control unit 40. The force threshold value is preferably ascertained in this embodiment in such a manner that the force measuring devices 42 detect a compressive force when the plug connection is being provided. The detected compressive force is then stored as the force threshold value in the detection unit 38. The disconnection signal is therefore transmitted to the control unit 40 in this embodiment if the detected tensile force when releasing the plug connection exceeds the compressive force when providing the plug connection. It is thereby irrelevant whether the tensile force is caused by the plug 24 being directly pulled out of the contact socket or by the electrical line 26 being pulled.

Figure 4:
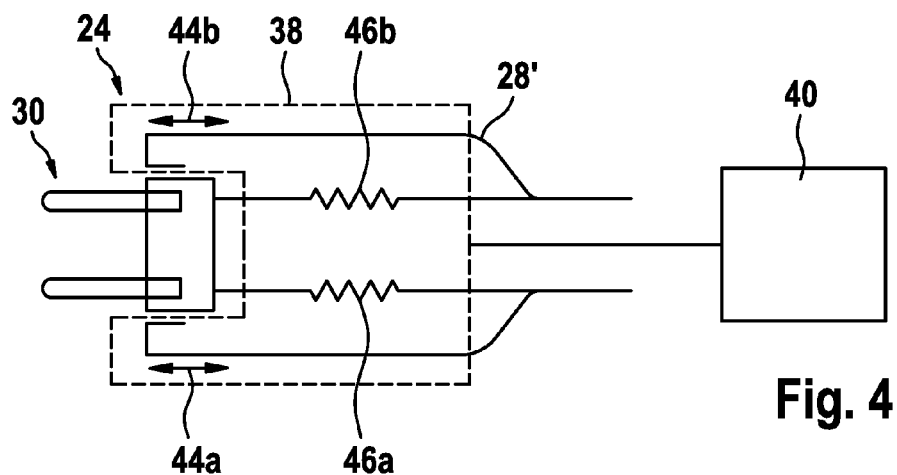

A further embodiment of the plug 24 according to the invention is shown in FIG. 4. The detection unit 38 has a displaceable element 28' which corresponds to the plug housing 28' or a portion of the plug housing 28' in the present example. The displaceable element is mounted in a displaceable manner with respect to the contact pins 30 as indicated by the arrows 44*a*, 44*b* from FIG. 4. The detection unit 38 furthermore has spring elements 46*a*, 46*b* which exert a preload force on the displaceable element 28' in order to hold said displaceable element 28' in an initial position depicted in FIG. 4.

When the electrical plug 24 is pulled out of the contact socket 18, the plug housing 28' or the displaceable element 28' is subjected to a tensile force. If this tensile force exceeds the preload force which is provided by means of the spring elements and represents the force threshold value in this exemplary embodiment, the displaceable element 28' is then moved out of the initial position depicted in FIG. 4 to the right. In so doing, a switch of the detection unit 38, which is not specified in FIG. 4 and generates the disconnection signal, can, for example, be actuated. As a result, the energy transmission across the electrical line 26 can be interrupted by means of the control unit 40 prior to the electrical connection being broken between the contact pins 30 and the contact socket 18.

Figure 5:
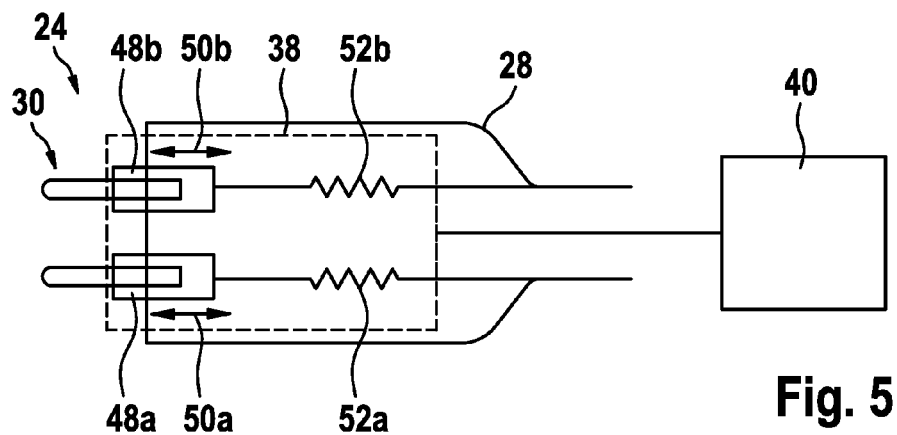

A further embodiment of the plug 24 according to the invention is shown in FIG. 5. The detection unit 38 has pushing devices 48*a*, 48*b* which are mounted in a displaceable manner in relation to the contact pins 30 (see arrows 50*a*, 50*b* in FIG. 5). The pushing devices 48*a*, 48*b* are designed as sleeves 48*a*, 48*b* in this exemplary embodiment which are concentrically disposed with respect to the respective contact pins 30*a*, 30*b*. The detection unit 38 furthermore has further spring elements 52*a*, 52*b* which are supported on the plug housing 28 and exert a compressive force (in FIG. 5 a force towards the left) on the sleeves 48*a*, 48*b*.

If the plug 24 is inserted into the contact socket 18, the sleeves 48 are supported on a base of the contact socket 18. As a result, the sleeves 48 are completely pushed into the plug housing 28 during the course of the insertion process. As soon as a predefined end position of the sleeves 48 is achieved, the insertion of the plug 24 into the contact socket 18 is detected by means of the detection unit 38, and the switch-on signal is transmitted to the control unit 40. On the basis of the switch-on signal, the control unit 40 can start the energy transmission process.

When removing the plug 24 from the contact socket 18, the sleeves 48 are pushed out of the plug housing 28 by means of the additional spring elements 52. If the sleeves 48 exceed a predefined distance of travel, i.e. a predefined movement threshold value, as a result of this movement, the releasing of the plug connection is then detected by the detection unit 38 and a disconnection signal is generated which is transmitted to the control unit 40 in order to switch off the energy transmission.

In this embodiment, the movement of the contact pins 30 relative to the contact socket 18 can therefore be detected by means of the sleeves 48. The switch-off/switch-on signal is generated as a function of this detected movement of the contact pins 30.

Although preferred embodiments of the plug 24 according to the invention and of the energy transmission arrangement 22 according to the invention have been shown, it goes without saying that different variations and modifications can be performed without departing from the scope of the invention.

For example, only a force measuring signal or a movement signal can be provided by the detection unit 38 which is subsequently evaluated in the control unit 40 on the basis of a comparison with predefined threshold values. This means that the releasing/providing of the plug connection is recognized in the control unit 40 and as a result the shut-down/start-up of the energy transmission process is initiated.

In addition, there is the option of combining a plurality of different embodiments of the detection unit 38 with one another in order to thereby increase the reliability of detecting whether the plug connection is being released/provided.

It goes furthermore without saying that the plug 24 according to the invention or the energy transmission arrangement 22 according to the invention can be used not only with charging cables for electric vehicles/plug-in hybrid vehicles but also with any electrical devices, e.g. household appliances or electric tools. The inventive electrical plug is used particularly advantageously with all electrical devices which have a high power consumption.

The invention claimed is:

1. An electrical plug having:
    a connection unit which can be coupled to an electrical line in order to transmit electrical energy,
    at least one electrical contact pin which has a plug section and a coupling Section, wherein the coupling section is electrically coupled to the connection unit, and wherein the plug section is designed to provide a releasable plug connection to an associated contact socket in order to electrically couple the electrical contact pin to the associated contact socket, and
    a detection unit which is designed to detect a tensile force which is exerted on the electrical contact pin or a movement of the electrical contact pin, or both, relative to the associated contact socket, and to provide a disconnection signal for interrupting an electrical energy transmission process.

2. The electrical plug according to claim 1, wherein the detection unit is designed to provide the disconnection signal if the tensile force exceeds a force threshold value or the movement exceeds a movement threshold value, or both.

3. The electrical plug according to claim 2, wherein the threshold values, that include the force threshold value and the movement threshold value, are determined in such a way that the releasable plug connection to the associated contact socket exists at least until at least one of the threshold values has been reached.

4. The electrical plug according to claim 1, wherein the detection unit has a force measuring device which is mechanically coupled to the electrical contact pin and which is designed to detect the tensile force based on a force between the electrical contact pin and the associated contact socket when releasing the releasable plug connection.

5. The electrical plug according to claim 4, wherein the force measuring device is designed to detect a compressive force between the electrical contact pin and the associated contact socket when providing the releasable plug connection, and wherein the force threshold value is a detected value of the compressive force when providing the releasable plug connection.

6. The electrical plug according to claim 1, wherein the detection unit has a displaceable element which is held in an initial position by means of a preload force and which can be moved out of the initial position if the tensile force exceeds the preload force, and wherein the preload force is the force threshold value.

7. The electrical plug according to claim 6, wherein the detection unit has a spring element for providing the preload force.

8. The electrical plug according to claim 1, wherein the detection unit has a pushing device which can be displaced based on the movement of the electrical contact pin, and wherein the detection unit is designed to provide the disconnection signal if the pushing device is displaced by the movement threshold value with respect to an initial position.

9. The electrical plug according to claim 8, wherein the detection unit is designed to provide a switch-on signal for starting the electrical energy transmission process if the initial position of the pushing device is set.

10. The electrical plug according to claim 8, wherein the detection unit further has a spring element which is designed to exert a force on the pushing device in order to displace said pushing device in accordance with the movement of the electrical contact pin.

11. The electrical plug according to claim 8, wherein the pushing device has a sleeve which is disposed concentrically with respect to the electrical contact pin.

12. The electrical plug according to claim 1, wherein the detection unit is designed to provide the disconnection signal or a switch-on signal, or both, to a control unit for the purpose of controlling the electrical energy transmission process.

13. An energy transmission arrangement comprising: an electrical plug according to claim 1,
 an electrical line which is electrically coupled to the connection unit of the electrical plug, and
 a control unit which is electrically coupled to the detection unit of the electrical plug and which is designed to control the transmission of electrical energy across the electrical line based on the disconnection signal or a switch-on signal, or both, of the detection unit.

14. The energy transmission arrangement according to claim 13, wherein the electrical line is further coupled to a traction battery of an electrically driven vehicle, and wherein the control unit is designed to interrupt a charging process of the traction battery based on the disconnection signal.

\* \* \* \* \*